(12) United States Patent
Baalu et al.

(10) Patent No.: US 9,868,447 B2
(45) Date of Patent: Jan. 16, 2018

(54) CONTROLLING VEHICLE SYSTEMS WITH MOBILE DEVICES

(71) Applicant: Harman International Industries, Incorporated, Stamford, CT (US)

(72) Inventors: Arvin Baalu, Bangalore (IN); Shyam Vedantam, Bengaluru (IN); Vishnu Sundaram, Bangalore (IN)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

(21) Appl. No.: 15/449,140

(22) Filed: Mar. 3, 2017

(65) Prior Publication Data

US 2017/0174228 A1 Jun. 22, 2017

Related U.S. Application Data

(62) Division of application No. 14/605,890, filed on Jan. 26, 2015, now Pat. No. 9,610,957.

(51) Int. Cl.
*G05D 1/00* (2006.01)
*B60W 50/08* (2012.01)
(Continued)

(52) U.S. Cl.
CPC .............. *B60W 50/08* (2013.01); *B60K 35/00* (2013.01); *B60K 37/02* (2013.01); *B60K 37/06* (2013.01); *B60R 11/00* (2013.01); *H04W 4/005* (2013.01); *B60K 2350/1004* (2013.01); *B60K 2350/106* (2013.01); *B60K 2350/1028* (2013.01); *B60K 2350/1044* (2013.01); *B60K 2350/1048* (2013.01); *B60K 2350/352* (2013.01);
(Continued)

(58) Field of Classification Search
CPC ....... B60W 50/08; B60K 35/00; B60K 37/02; B60K 37/06; B60R 11/00; H04W 4/005
USPC .................... 701/1; 340/438, 425.5
See application file for complete search history.

(56) References Cited

U.S. PATENT DOCUMENTS

2002/0044049 A1* 4/2002 Saito .................. B60G 17/0185
340/438
2004/0058714 A1* 3/2004 Sawamura ............ G06F 1/1613
455/566

(Continued)

FOREIGN PATENT DOCUMENTS

CN 102029959 * 9/2009
WO 2014152628 A1 9/2014

OTHER PUBLICATIONS

ISA Korean Intellectual Property Office, International Search Report and Written Opinion Issued in Application No. PCT/US2016/013678, dated May 10, 2016, WIPO, 16 pages.

*Primary Examiner* — Muhammad Shafi
(74) *Attorney, Agent, or Firm* — McCoy Russell LLP (57) ABSTRACT

Embodiments are disclosed for an in-vehicle system and methods of controlling vehicle systems with a mobile device in communication with the in-vehicle system. In one embodiment, an in-vehicle system includes a display device and an interface system communicatively connected to one or more vehicle sensors. The interface system may be configured to receive sensor signals from the one or more vehicle sensors, transmit the sensor signals to a mobile device, receive control signals from the mobile device, and transmit the control signals to a target vehicle system, the control signals responsive to the one or more vehicle sensors.

18 Claims, 7 Drawing Sheets

(51) Int. Cl.
*B60K 35/00* (2006.01)
*B60K 37/06* (2006.01)
*B60R 11/00* (2006.01)
*H04W 4/00* (2009.01)
*B60K 37/02* (2006.01)

(52) U.S. Cl.
CPC .. *B60K 2350/357* (2013.01); *B60K 2350/925* (2013.01); *B60K 2350/928* (2013.01)

(56) References Cited

U.S. PATENT DOCUMENTS

| | | |
|---|---|---|
| 2007/0291664 A1 | 12/2007 | Weyl et al. |
| 2010/0157061 A1* | 6/2010 | Katsman ............. G07C 5/0866 348/149 |
| 2014/0066049 A1 | 3/2014 | Cho et al. |
| 2014/0100740 A1 | 4/2014 | Chutorash et al. |
| 2014/0172197 A1 | 6/2014 | Ganz et al. |

\* cited by examiner

CONTROLLING VEHICLE SYSTEMS WITH MOBILE DEVICES

CROSS REFERENCE TO RELATED APPLICATIONS

The present application is a divisional of U.S. Non-Provisional patent application Ser. No. 14/605,890, entitled "CONTROLLING VEHICLE SYSTEMS WITH MOBILE DEVICES," filed on Jan. 26, 2015, the entire contents of which are hereby incorporated by reference for all purposes.

FIELD

The disclosure relates to an in-vehicle interface system and associated controls.

BACKGROUND

Vehicles may include an in-vehicle computing system, such as a head unit for an infotainment system, which may provide multimedia and control functions. For example, an in-vehicle computing system may provide navigational, multimedia playback, telephonic, social media interactive, mobile device charging, and/or other functions and receive user input to control elements of the vehicle and in-vehicle computing system. In order to provide such functionality, in-vehicle computing systems include complex and costly processing and memory resources that enable the execution of an operating system and various applications. Often, such resources are also present in a mobile device of a user of the vehicle.

SUMMARY

Embodiments are disclosed for in-vehicle systems and methods of controlling vehicle systems with a mobile device in communication with the in-vehicle system. In example embodiments, an in-vehicle system includes a display device and an interface system communicatively connected to one or more vehicle sensors. The interface system may be configured to receive sensor signals from the one or more vehicle sensors, transmit the sensor signals to a mobile device, receive control signals from the mobile device, and transmit the control signals to a target vehicle system, the control signals responsive to the one or more vehicle sensors.

In example embodiments, a method of controlling vehicle systems with a mobile device may include receiving, at an in-vehicle interface system, sensed data from one or more vehicle sensors, transmitting the received sensed data from the in-vehicle interface system to the mobile device, receiving, at the in-vehicle interface system, display instructions from the mobile device, and transmitting the display instructions to a display integrated within the vehicle. The method may also include receiving, at the in-vehicle interface system, control instructions from the mobile device, the control instructions being generated based on the sensed data, and transmitting the control instructions to a target vehicle system of the vehicle.

In other example embodiments, an in-vehicle computing system may include a display device integrated into a vehicle and an interface system communicatively connected to one or more vehicle sensors, one or more control elements, and a mobile device. The interface system may be configured to receive user input data from one or more of the control elements, transmit the received user input data from the interface system to the mobile device, bypassing any processor in the vehicle. The interface system may further be configured to receive display instructions from the mobile device, the display instructions including adjustments to an image displayed on the display device based on the user input data, and transmit the display instructions to the display device while bypassing any processor in the vehicle. The interface system may further be configured to receive control instructions from the mobile device, and transmit the control instructions to a target vehicle system of the vehicle.

BRIEF DESCRIPTION OF THE DRAWINGS

The disclosure may be better understood from reading the following description of non-limiting embodiments, with reference to the attached drawings, wherein below.

DETAILED DESCRIPTION

As described above, a mobile device may include available processing and/or storage resources that equal or exceed those resources typically used to provide the functionality associated with an in-vehicle computing system. By utilizing such untapped resources of the mobile device, an in-vehicle computing system may be simplified to include a display and an interface system, while forgoing any processing or storage elements. Sensor and/or control signals may be passed from in-vehicle sensors and controls to the mobile device via the interface system, such that the mobile device may process such signals and provide control and display signals for respectively controlling in-vehicle systems (e.g., a speaker system) and the display.

Figure 1A:
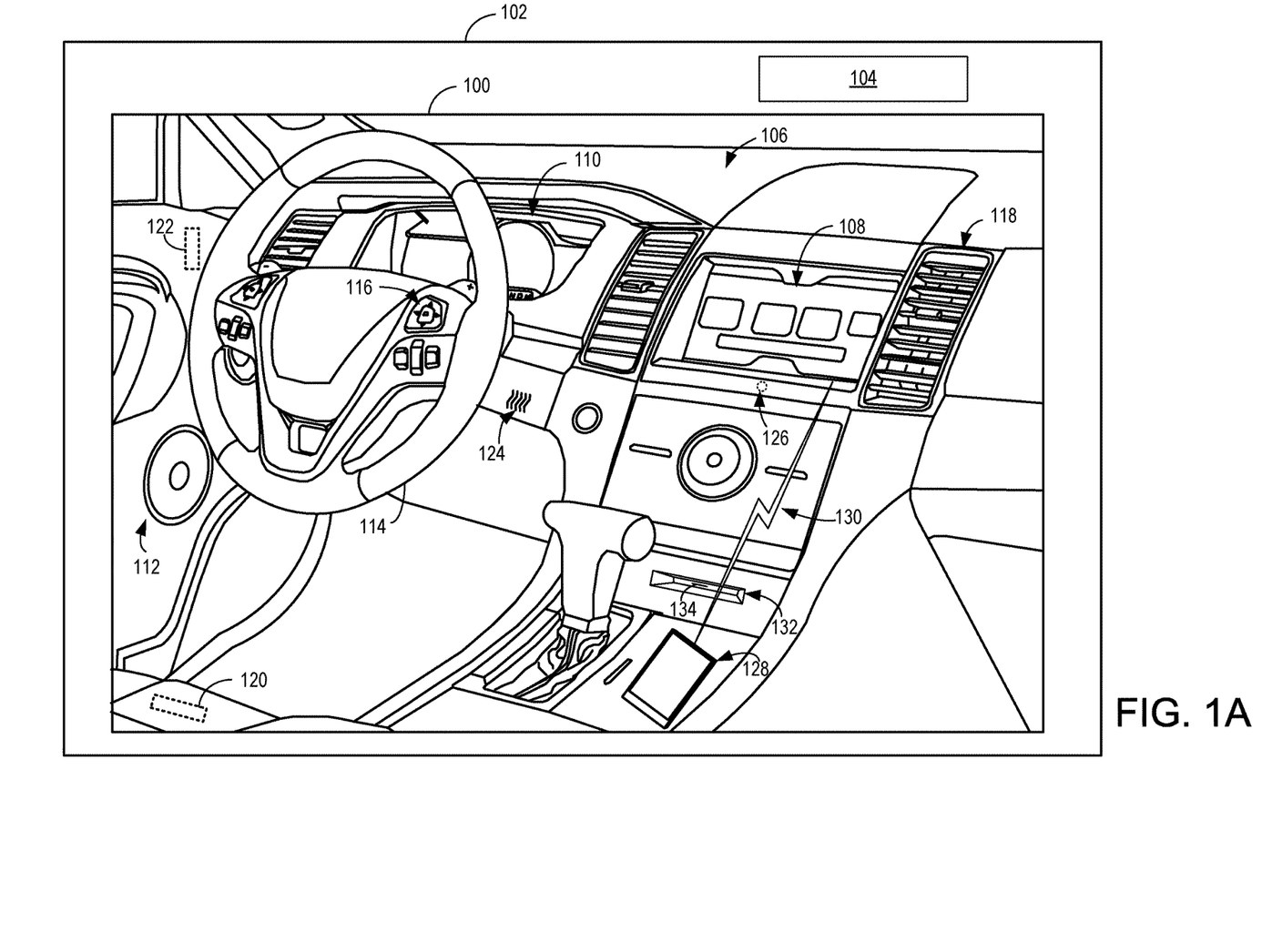
FIG. 1A is a partial view of a vehicle cabin including an in-vehicle computing system and a mobile device, in accordance with one or more embodiments of the present disclosure.

FIG. 1A shows an example partial view of an interior of a cabin 100 of a vehicle 102, in which a driver and/or one or more passengers may be seated. Vehicle 102 of FIG. 1A may be a motor vehicle including drive wheels (not shown) and an internal combustion engine 104. Internal combustion engine 104 may include one or more combustion chambers which may receive intake air via an intake passage and exhaust combustion gases via an exhaust passage. Vehicle 102 may be a road automobile, among other types of vehicles. In some examples, vehicle 102 may include a hybrid propulsion system including an energy conversion device operable to absorb energy from vehicle motion and/or the engine and convert the absorbed energy to an energy form suitable for storage by an energy storage device. Vehicle 102 may include a fully electric vehicle, incorporating fuel cells, solar energy capturing elements, and/or other energy storage systems for powering the vehicle.

As shown, an instrument panel 106 may include various displays and controls accessible to a driver of vehicle 102, such as a touch screen 108 of an in-vehicle interface system (e.g., an infotainment system), an audio system control panel, and an instrument cluster 110. While the example system shown in FIG. 1A includes audio system controls that may be performed via a user interface of an in-vehicle interface system such as touch screen 108 without a separate audio system control panel, in other embodiments, the vehicle may include an audio system control panel, which may include controls for a conventional vehicle audio system such as a radio, compact disc player, MP3 player, etc. The audio system controls may include features for controlling one or more aspects of audio output via speakers 112 of a vehicle speaker system. For example, the audio system controls may control a volume of audio output, a distribution of sound among the individual speakers of the vehicle speaker system, an equalization of audio signals, and/or any other aspect of the audio output.

Instrument cluster 110 may include various gauges such as a fuel gauge, tachometer, speedometer, and odometer, as well as indicators and warning lights. A steering wheel 114 may project from the instrument panel below instrument cluster 110. Optionally, steering wheel 114 may include controls 116 which may be used in conjunction with touch screen 108 to navigate features of an in-vehicle interface system and to control the in-vehicle interface system. In addition to the components depicted in FIG. 1A, it will be appreciated that instrument panel 106 may include additional components such as door and window controls, a cigarette lighter which may also be used as a low-voltage power outlet, a glove compartment, and/or any other suitable elements. In one or more embodiments, control of in-vehicle climate via climate control system vents 118 may be performed using touch screen 108 and thus no separate climate control interface may be included in instrument panel 106. In alternative embodiments, however, a separate climate control interface may be provided.

The cabin 100 may include one or more sensors for monitoring the vehicle, the user, and/or the environment. For example, the cabin 100 may include one or more seat-mounted pressure sensors 120 configured to measure the pressure applied to the seat to determine the presence of a user. The cabin 100 may include one or more door sensors 122 configured to monitor door activity, such as the opening and/or closing of the door, the locking of the door, the operation of a window of the door, and/or any other suitable door activity event. A humidity sensor 124 may be included to measure the humidity content of the cabin. A microphone 126 may be included to receive user input in the form of voice commands, to enable a user to conduct telephone calls, and/or to measure ambient noise in the cabin 100. It is to be understood that the placement of the sensors illustrated in FIG. 1A is exemplary, and one or more additional or alternative sensors may be positioned in any suitable location of the vehicle. For example, additional sensors may be positioned in an engine compartment, on an external surface of the vehicle, and/or in other suitable locations for providing information regarding the operation of the vehicle, ambient conditions of the vehicle, a user of the vehicle, etc.

The cabin 100 may also include one or more user objects, such as mobile device 128, that are stored in the vehicle before, during, and/or after travelling. The mobile device may include a smart phone, a tablet, a laptop computer, a portable media player, and/or any suitable mobile computing device. The mobile device 128 may be connected to the in-vehicle interface system via communication link 130. The communication link 130 may be wired (e.g., via Universal Serial Bus [USB], Mobile High-Definition Link [MHL], High-Definition Multimedia Interface [HDMI], etc.) or wireless (e.g., via BLUETOOTH, WI-FI, Near-Field Communication [NFC], etc.) and configured to provide two-way communication between the mobile device and the in-vehicle interface system. For example, the communication link 130 may provide sensor and/or control signals from in-vehicle systems and the touch screen 108 to the mobile device 128 and may provide control and/or display signals from the mobile device 128 to in-vehicle systems and the touch screen 108. The communication link 130 may also provide power to the mobile device 128 from an in-vehicle power source in order to charge an internal battery of the mobile device.

While the mobile device 128 is illustrated as being spatially separated from the in-vehicle interface system and connected via a substantially external communication link (e.g., a cable or radiofrequency signal), it is to be understood that a mobile device storage structure 132 or other storage structure may be formed in the instrument panel 106 or other location in the vehicle to hold the mobile device in a particular location. The storage structure may include an integrated connector 134 to which the mobile device 128 may be attached or "docked" for providing a substantially internal communication link between the mobile device and the interface system.

Figure 1B:
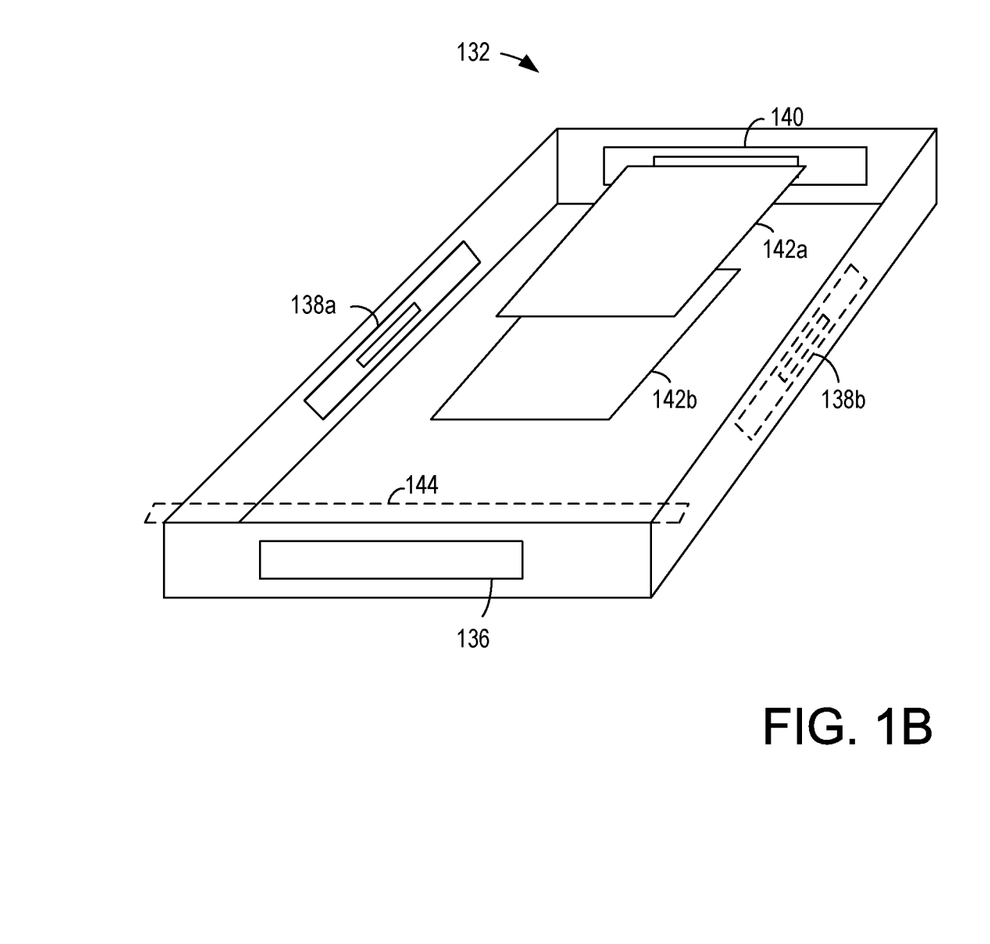
FIG. 1B is a detail view of a mobile device storage structure, in accordance with one or more embodiments of the present disclosure.

Turning to FIG. 1B, a detailed view of the mobile device storage structure 132 is shown in accordance with one or more embodiments. The storage structure 132 may include a front phone insert slot 136 for receiving a mobile device, such as mobile device 128 of FIG. 1A. The storage structure 132 may include one or more side connector lock engaging mechanisms 138a and 138b and a rear connector lock engaging mechanism 140 for securing and/or providing power/communication connectivity to the mobile device. The side connector lock engaging mechanisms 138a and 138b may be positioned along an inner surface (e.g., toward an opening of the storage structure for accepting the mobile device) of the longitudinal or side walls of the storage structure 132. The rear connector lock engaging mechanism 140 may be configured to be positioned along an inner surface of the lateral or rear wall of the storage structure (e.g., at a rear end toward which a mobile device may be directed when inserting the mobile device into the storage structure). The storage structure 132 may include a top holder 142a and a bottom holder 142b for providing further security, power, and/or communication connectivity to the mobile device. One or more of the above-described mechanisms and holders may be utilized to maintain the mobile device within the storage structure and/or in a particular position within the storage structure.

The storage structure 132 may be configured to be releasably inserted into an instrument panel or other structure in the vehicle cabin. For example, the storage structure 132 may be configured to slide in and out of a socket or other housing within instrument panel 106 of FIG. 1A. In some embodiments, the storage structure 132 may include an emergency manual release 144 to enable a user to gain access to a mobile device within the storage structure and/or to remove the storage structure from a housing.

Figure 2:
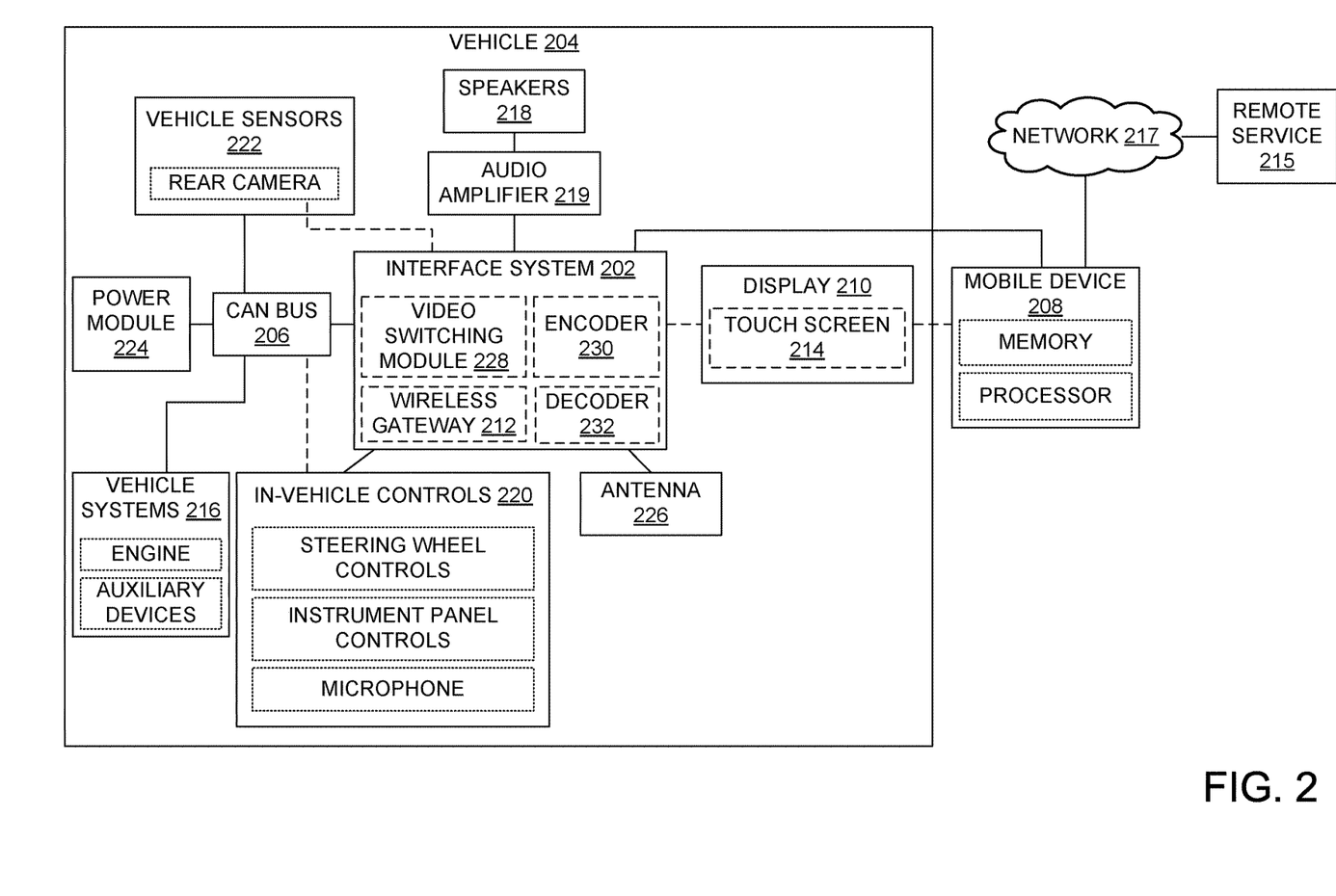
FIG. 2 shows a block diagram of an interface system within a vehicle, in accordance with one or more embodiments of the present disclosure.

FIG. 2 shows a block diagram of an in-vehicle interface system 202 and related elements with which the in-vehicle interface system 202 is in communication. The in-vehicle interface system 202 may be located and/or integrated within a vehicle 204, such as vehicle 102 of FIG. 1A. The in-vehicle interface system 202 may communicate with one or more elements within the vehicle, including but not limited to vehicle systems connected via an in-vehicle interconnect, such as Controller-Area Network (CAN) bus 206. It is to be understood that any suitable number and/or combination of interconnects may be used to permit communication between the interface system 202 and various in-vehicle components, including but not limited to CAN buses, Media Oriented Systems Transport (MOST) buses, Ethernet-based interconnects, etc. Interconnects may communicate directly with in-vehicle components and/or may communicate with such components via intervening processors. In some embodiments, one or more in-vehicle components may communicate directly with the interface system 202 without or in addition to communicating with the interface system 202 via the CAN bus 206.

The interface system 202 may pass information from the CAN bus to an external mobile device 208 in order to leverage the processor and other computing resources of the mobile device 208 for controlling a display 210. The interface system 202 may be connected to the mobile device 208 via a wired connection in some embodiments. In additional or alternative embodiments, the interface system 202 may include a wireless gateway 212, enabling wireless connectivity between the interface system 202 and the mobile device 208. The display 210 may display images to provide visual feedback related to navigation, media playback, telephone, vehicle system control (e.g., cabin temperature control, cruise control settings, odometer output/settings, vehicle diagnostics control, vehicle operating mode control, etc.), and/or other vehicle-related functions. In some embodiments, the display 210 may include a touch screen 214, such as touch screen 108 of FIG. 1A, enabling user input for controlling the vehicle-related functions to be received via the display 210.

The mobile device 208 may receive signals from the interface system 202 and/or the display 210, process the signals based on non-transitory instructions stored on a memory device and executed by a processor, and output display and/or control signals to the display 210 and/or the interface system 202. In some embodiments, the mobile device 208 may communicate with a remote service 215 via a network 217. In such embodiments, the mobile device may leverage the computing resources of the remote service and/or additional information stored at the remote service 215 to perform and/or assist with the processing of the signals from the interface system 202. For example, the mobile device may utilize the remote service 215 to assist with generating a response to a particular user input. Although one remote service is illustrated in FIG. 2, it is to be understood that the mobile device may communicate with one or more remote services during operation.

As illustrated, the mobile device 208 is separate from and not integrated within the vehicle, although the mobile device may be located within the vehicle cabin during travel and while connected to the interface system 202 (e.g., via a communication link, such as communication link 130 of FIG. 1A). In contrast, each of the other systems and elements illustrated within the vehicle 204 in FIG. 2 may be integrated within the vehicle. The mobile device may include computing resources (e.g., processor(s) and memory) that are separate from computing resources integrated in the vehicle (e.g., the computing resources utilized by the components illustrated within the vehicle 204 of FIG. 2). While the mobile device may operate in accordance with an operating system and run one or more applications, the interface system 202 and/or display 210 may not include an operating system and/or computing resources for operating in accordance with an operating system or running applications. For example, the display 210 and interface system 202 may not provide any user interface when disconnected from the computing resources (e.g., the processor and memory) of the mobile device 208. In some embodiments, the display 210 and the interface system 202 may not include a memory device and/or a processor. In other embodiments, the display 210 and the interface system 202 may only include a memory device and/or a processor capable of providing basic functionality related to the elements (e.g., displaying images in accordance with display instructions and/or transmitting/receiving signals). In such embodiments, the memory device(s) and/or processor(s) of the display 210 and the interface system 202 may not include or be capable of running an operating system and/or providing a user interface when operating independently from the mobile device 208.

Display signals may control the output of display 210, while control signals may control one or more other vehicle systems 216 in communication with the interface system 202. For example, the vehicle systems 216 may include controllable elements related to the engine and/or auxiliary elements, such as windshield wipers, windows, doors/door locks, headlights, air conditioning systems, etc. The control signals may also control audio output at one or more speakers 218 of the vehicle 204. For example, the control signals may adjust audio output characteristics such as volume, equalization, audio image (e.g., the configuration of the audio signals to produce audio output that appears to a user to originate from one or more defined locations), audio distribution among a plurality of speakers 218, etc.

User input may be accepted via one or more in-vehicle controls 220 transmitted to the mobile device 208 as additional or alternative input sources to the optional touch screen of display 210, for example. The in-vehicle controls 220 may include any suitable user-actuatable element within and/or on the vehicle, including but not limited to any number or combination of buttons, sliders, switches, knobs, levers, joysticks, key pads, pedals, etc. For example, in-vehicle controls 220 may include control elements within a cabin of the vehicle, such as steering wheel controls (e.g., steering wheel-mounted audio system controls, cruise controls, windshield wiper controls, headlight controls, turn signal controls, etc.), instrument panel controls, microphone(s), accelerator/brake/clutch pedals, a gear shift, door/window controls positioned in a driver or passenger door, seat controls, cabin light controls, audio system controls, cabin temperature controls, etc. Control elements positioned on an outside of a vehicle (e.g., controls for a security system) may also be connected to the interface system 202 via the CAN bus 206. The control elements of the in-vehicle controls 220 may be physically and permanently positioned on and/or in the vehicle for receiving user input, even when the mobile device is removed from the vehicle.

The CAN bus 206 may communicate with one or more vehicle sensors 222 in order to provide an indication of operating states and/or conditions of the vehicle to the interface system 202. The interface system 202 may pass the sensor signals from the vehicle sensors 222 to the mobile device 208 in order to provide contextual information relating to the operation and/or environment of the vehicle and/or user to the mobile device. The vehicle sensors 222 may include any suitable sensor, such as the in-cabin sensors described above with respect to FIG. 1A, vehicle operating state sensors (e.g., sensors monitoring fuel storage, engine temperature, oil storage, engine speed, vehicle speed, transmission/gear settings, tire pressure, traction, diagnostics information, etc.), and environmental sensors (e.g., a rear camera and/or other sensors monitoring ambient conditions, such as temperature, humidity, pressure, road surface/conditions, etc.). Upon receiving the user input and/or the sensor signals at the mobile device 208, the mobile device may determine an adjustment to the display 210 and/or control instructions for the one or more vehicle systems 216.

Information regarding power states and/or power control signals may be exchanged between a power module 224 and the mobile device 208 via the CAN bus 206 and the interface system 202. For example, the mobile device 208 may receive information from the power module 224 and update the display 210 to provide feedback to the user regarding the power state of the one or more vehicle components. The mobile device 208 may additionally or alternatively provide control signals to the power module 224 based on user input, information received from the vehicle sensors 222, and/or information received from the power module 224.

An antenna 226 may provide AM/FM radio signals to the interface system 202 for processing at the mobile device 208. For example, the mobile device may control the speakers 218 to output audio broadcast by AM/FM radio stations and control the display 210 to display information related to the AM/FM radio stations and/or content being broadcast (e.g., information broadcast alongside the audio via a radio data system).

In order to communicate with the varied vehicle systems and mobile device as described above, the interface system 202 may include one or more modules in some embodiments for resolving different communication protocols and other issues that may arise while passing signals between disparate systems. For example, the interface system 202 may include a video switching module 228 to synchronize and/or format a video feed from a rear camera for display on the display 210. The interface system 202 may include an encoder 230 and/or a decoder 232 for converting signals received from one system and/or device to a format that is compatible with or otherwise able to be interpreted by a target system and/or device. It is to be understood that one or more of the above-described modules are optional, and in some embodiments, the interface system 202 may pass received signals to another system and/or device without providing any adjustment to the signals.

Figure 3:
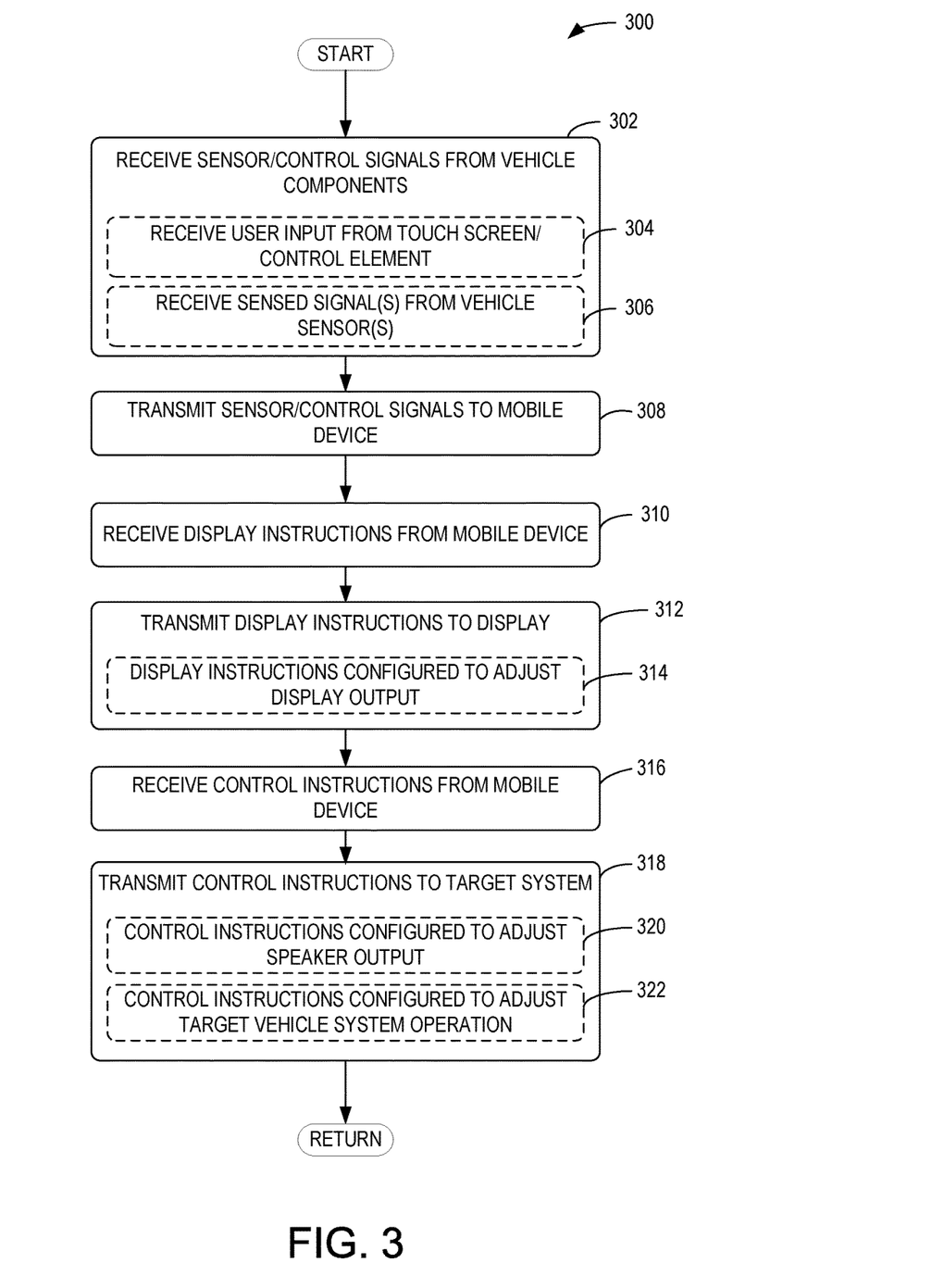
FIG. 3 is a flow chart of a method of controlling one or more vehicle systems with a mobile device, in accordance with one or more embodiments of the present disclosure.

FIG. 3 is a flow chart of a method 300 of controlling vehicle systems with a mobile device. For example, the method 300 may be performed by the interface system 202 of FIG. 2. The method 300 includes, at 302, receiving sensor and/or control signals from vehicle components. For example, as indicated at 304, the interface system may receive user input from a touch screen and/or one or more control elements (e.g., user input devices, such as steering wheel controls, instrument panel controls, microphone, etc.) of the vehicle. The interface system may additionally or alternatively receive sensed signals from one or more vehicle sensor, as indicated at 306.

The method 300 may include transmitting the received sensor and/or control signals to a mobile device (e.g., mobile device 208 of FIG. 2), as indicated at 308. At 310, the method 300 includes receiving display instructions from the mobile device. For example, the display instructions may be based upon one or more of the sensor and/or control signals received at 302. As indicated at 312, responsive to receiving the display instructions, the interface system may transmit the display instructions to a display device, such as display 210 of FIG. 2. The display instructions may be configured to adjust one or more features of the display output at the display, as indicated at 314. For example, the display instructions may provide an adjustment to an image displayed at the display device in order to provide feedback to a user regarding user input and/or data sensed by one or more vehicle sensors.

As indicated at 316, the method 300 includes receiving control instructions from the mobile device. For example, the control instructions may be generated based upon the user input and/or the sensed data. The received control instructions may be transmitted from the interface system to a target vehicle system, as indicated at 318. In some embodiments, the control instructions may be configured to adjust a speaker output, as indicated at 320. In additional or alternative embodiments, the control instructions may be configured to adjust the target vehicle system operation, as indicated at 322.

For example, a user may indicate a desired volume level for an audio system of a vehicle by providing user input to a control element of the vehicle. If the user provides the input to a touch screen of a display, the input may be transmitted directly to an in-vehicle interface system (or transmitted via a CAN bus or other interconnect) and passed to a mobile device without processing the user input. The mobile device may determine that the user input corresponds to a volume setting for the speakers of the vehicle and generate control signals instructing the speakers to change a volume level based on the user input (e.g., to increase/decrease the volume or to set the volume to a specified level). The mobile device may then send the control signals to the interface system, which passes the instructions defined by the control signals to the speaker system (e.g., via the CAN bus of the vehicle) without generating any further instructions or changes to the instructions for the speaker system. In this way, the speaker system may change a volume level of audio output only after the user input is sent from the control element to the mobile device (e.g., via the CAN bus and/or the interface system), processed by the mobile device to generate control signals defining instructions, and sent from the mobile device to the speaker system (e.g., via the interface system and the CAN bus of the vehicle).

The mobile device may also generate display instructions based on the received user input (e.g., an instruction to display an indication of the volume change requested by the user and/or performed by the speaker system) and send the instructions to the display device integrated within the vehicle (e.g., via the in-vehicle interface system). As described above, the display device may only change a display output after receiving display instructions from the mobile device (e.g., instructions generated based on user input and/or sensor signals).

Figure 4:
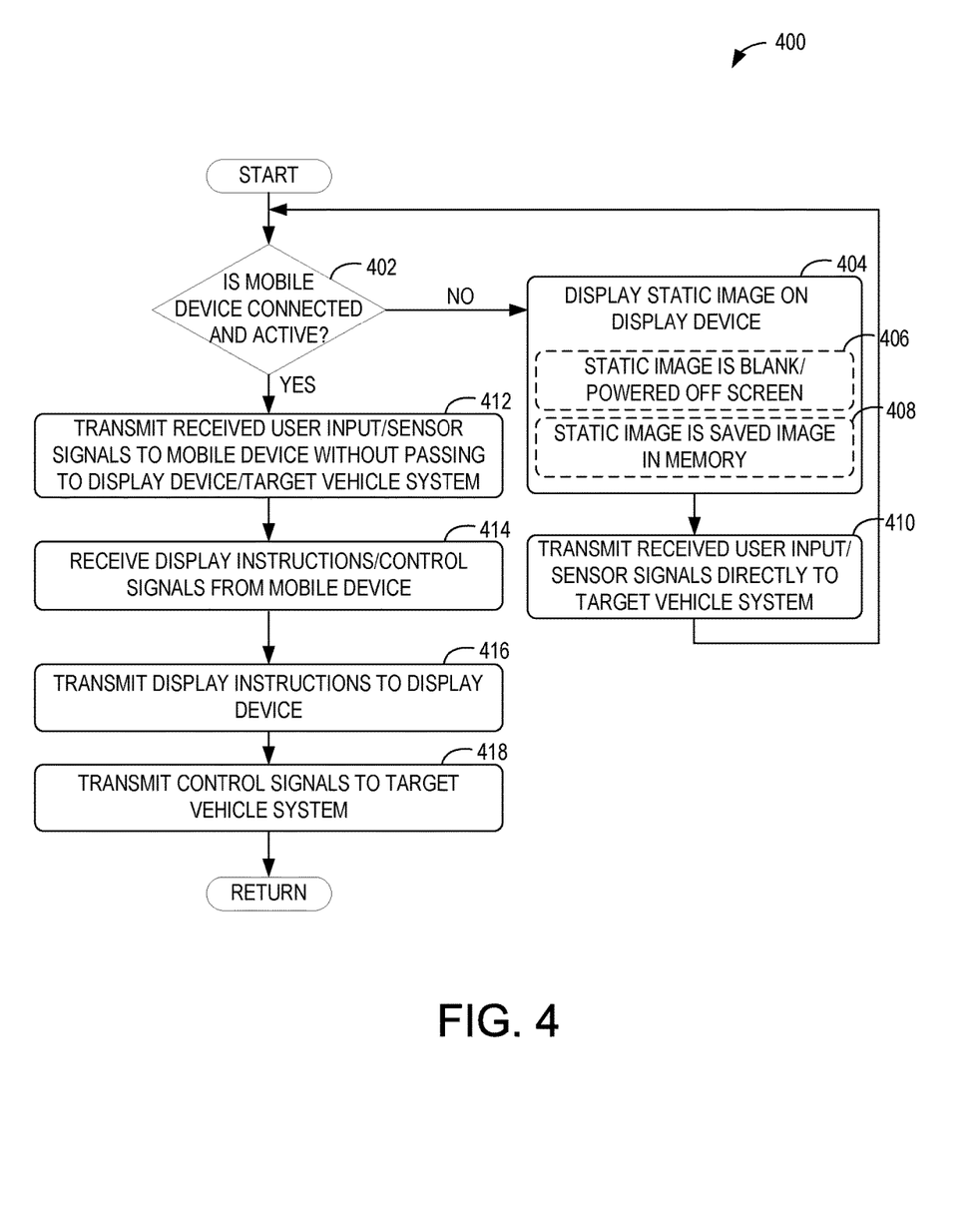
FIG. 4 is a flow chart of a method of controlling vehicle systems based on a status of a mobile device, in accordance with one or more embodiments of the present disclosure.

FIG. 4 is a flow chart of a method 400 of controlling vehicle systems based on a status of the mobile device. The method 400 may be performed by a system within a vehicle, such as an in-vehicle interface system. As indicated at 402, the method 400 includes determining if a mobile device is connected and active. For example, a mobile device may be determined to be connected upon establishing a wired or wireless connection to an interface system, such as interface system 202 of FIG. 2, and/or upon completing a data transaction between the mobile device and the interface system (e.g., receiving data from the mobile device, performing a handshake operation, etc.). The mobile device may be determined to be active while the mobile device is running a vehicle interface application and/or otherwise capable of receiving signals from the vehicle, processing the received signals, and transmitting signals to control one or more vehicle systems.

Responsive to determining that the mobile device is not connected and/or not active at 402, the method 400 proceeds to 404 to display a static image on a display device integrated in the vehicle (e.g., display 210 of FIG. 2). As indicated at 406, the static image may be a blank and/or powered off screen. For example, the display may only power on when the mobile device is connected and active. The display may alternatively power on based on a power on request from a user or automatically based on a power state of the vehicle. In some embodiments, a connection of the mobile device may trigger the power on state of the display, even if the mobile device is not active. For embodiments in which the display may power on before the mobile device is both connected and active, the blank screen may correspond to a hard wired configuration in which the display emits only a backlight or a particular light pattern when powered on and receiving no display instructions. As indicated at 408, the static image may correspond to a saved image in a memory device of the display device and/or other memory device communicatively connected to the display device. For example, the saved image may be a default image provided by a manufacturer or otherwise predefined during production of the display device or connected vehicle system. In some embodiments, a user may save the static image to memory and/or select the static image from one or more images stored in the memory.

While the mobile device is not connected and active (e.g., while the mobile device is not providing computational resources to process signals from the vehicle and control vehicle systems), the interface system may transmit received user input and/or sensor signals directly to a targeted vehicle system, as indicated at 410. For example, sensor signals may be processed by controllers within the vehicle to directly control other vehicle systems without providing feedback to the user. The transmission of user input directly to a targeted vehicle system allows the user to control vehicle systems, such as climate control systems, windows, doors, seats, interior/exterior lights, cruise control, etc., even when the mobile device is not connected and not actively providing feedback to the user. However, more advanced control over such vehicle systems, as well as feedback relating to the vehicle systems, may not be provided while the mobile device is not connected and not active. A touch screen of the display device may not accept user input while the mobile device is disconnected and/or inactive.

Returning to step 402, if a mobile device is determined to be connected and active, the method 400 may proceed to 412 to transmit received user input and/or sensor signals to a mobile device without passing the signals to the display device and/or target vehicle system. The interface system may thus bypass the display device and/or target vehicle system during transmission of the user input/sensor signals if the mobile device has not yet processed those particular user input/sensor signals. As indicated at 414, the method 400 may include receiving display instructions and/or control signals from the mobile device after the mobile device processes the user input and/or sensor signals. The interface system may transmit display instructions to the display device, as indicated at 416 and/or transmit control signals to a target vehicle system, as indicated at 418 based upon the signals received from the mobile device at 414.

For example, a user may indicate a desired cabin temperature by actuating a user interface control element located on an instrument panel of the vehicle. If a mobile device is not connected and/or is not active (e.g., not running a vehicle interface application), the user input may be transmitted to the interface system and then to the climate control system (e.g., via a CAN bus or other interconnect), bypassing the display device and the mobile device (if the mobile device is connected but inactive). The user input may not be processed by the interface system at all in some embodiments, such that the user input that arrives at the climate control system is identical to the signal sent to the interface system. In other embodiments, the interface system may only process the signals to alter the manner in which the signals are transmitted to a target vehicle system, without altering the instructions or information provided by the signals. For example, the interface system may alter a packet structure of the signals or rearrange data without changing the content represented by the data.

In the example, described above, the input provided by the user may be transmitted to the interface system (e.g., via a CAN bus or other interconnect) and passed along to the mobile device if the mobile device is connected and active. The mobile device may interpret the user input, generate a control signal for adjusting a vehicle climate control system, and send the control signal to the interface system. The interface system may pass the control signal to the climate control system (e.g., via the CAN bus or other interconnect), and the climate control system may change an operating state in accordance with the control signal.

In some embodiments, the mobile device may receive sensed data via the interface system regarding the current temperature in the cabin and the state of the climate control system in order to generate a control signal defining a particular action to be performed by the climate control system to achieve the desired cabin temperature indicated by the user input. In such embodiments, the climate control system may perform an action specified by the control signal from the mobile device and/or change to an operating state specified by the control signal in order to adjust the temperature in the cabin in accordance with the user input. In other embodiments, the mobile device may determine the desired cabin temperature or information indicating a desired cabin temperature based upon the user input and send a control signal indicating the determined temperature to the climate control system via the interface system and CAN bus. In such embodiments, the climate control system may determine and perform an adjustment and/or change of operating state based on the control signal.

Figure 5:
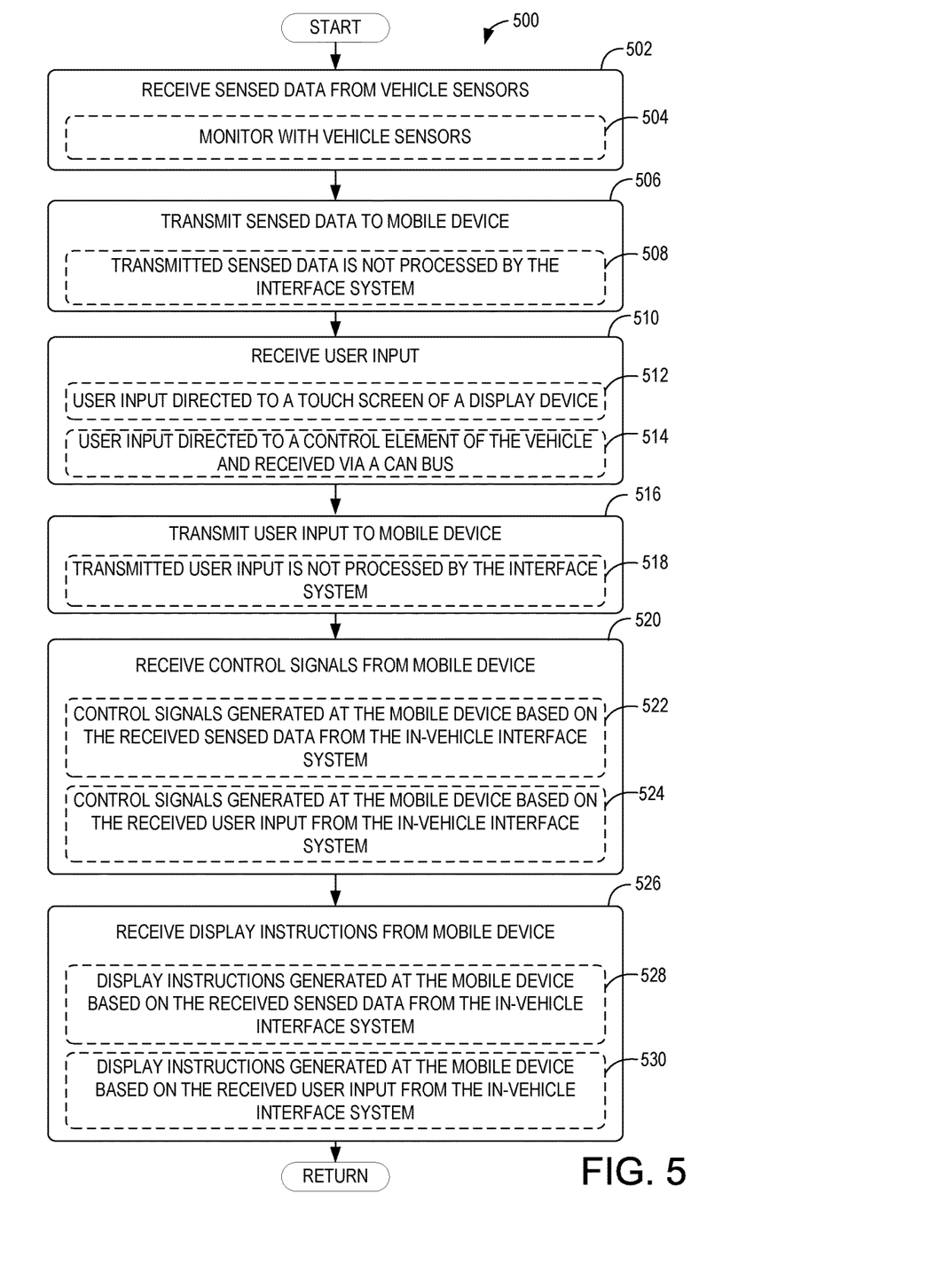
FIG. 5 is a flow chart of a method of controlling vehicle systems based on sensed data and user input processed by a mobile device, in accordance with one or more embodiments of the present disclosure.

FIG. 5 is a flow chart of a method 500 for controlling vehicle systems based on sensed data and user input processed by a mobile device. Method 500 includes receiving sensed data from one or more vehicle sensors, as indicated at 502. The sensed data may be generated by monitoring a vehicle, user, and/or environment with the vehicle sensors, as indicated at 504. The method 500 continues to 506 to include transmitting the sensed data to the mobile device. As indicated at 508, the transmitted sensed data may not be processed by the interface system. For example, while the signal transmitting the sensed data may be adjusted by the interface system to permit efficient and/or compatible transmission, the interface system may not interpret or otherwise alter the monitored content represented by the sensed data. In some embodiments, transmitting the received sensed data from the interface system to the mobile device may include transmitting the received sensed data without processing the received sensed data with any processor of the vehicle including and/or executing an operating system. For example, transmitting the received sensed data from the interface system to the mobile device may include bypassing any and/or processors in the vehicle such that the sensed data is not directed to any processor within the vehicle (e.g., integrated within the vehicle) prior to being received and/or processed by the mobile device.

Figure 6:
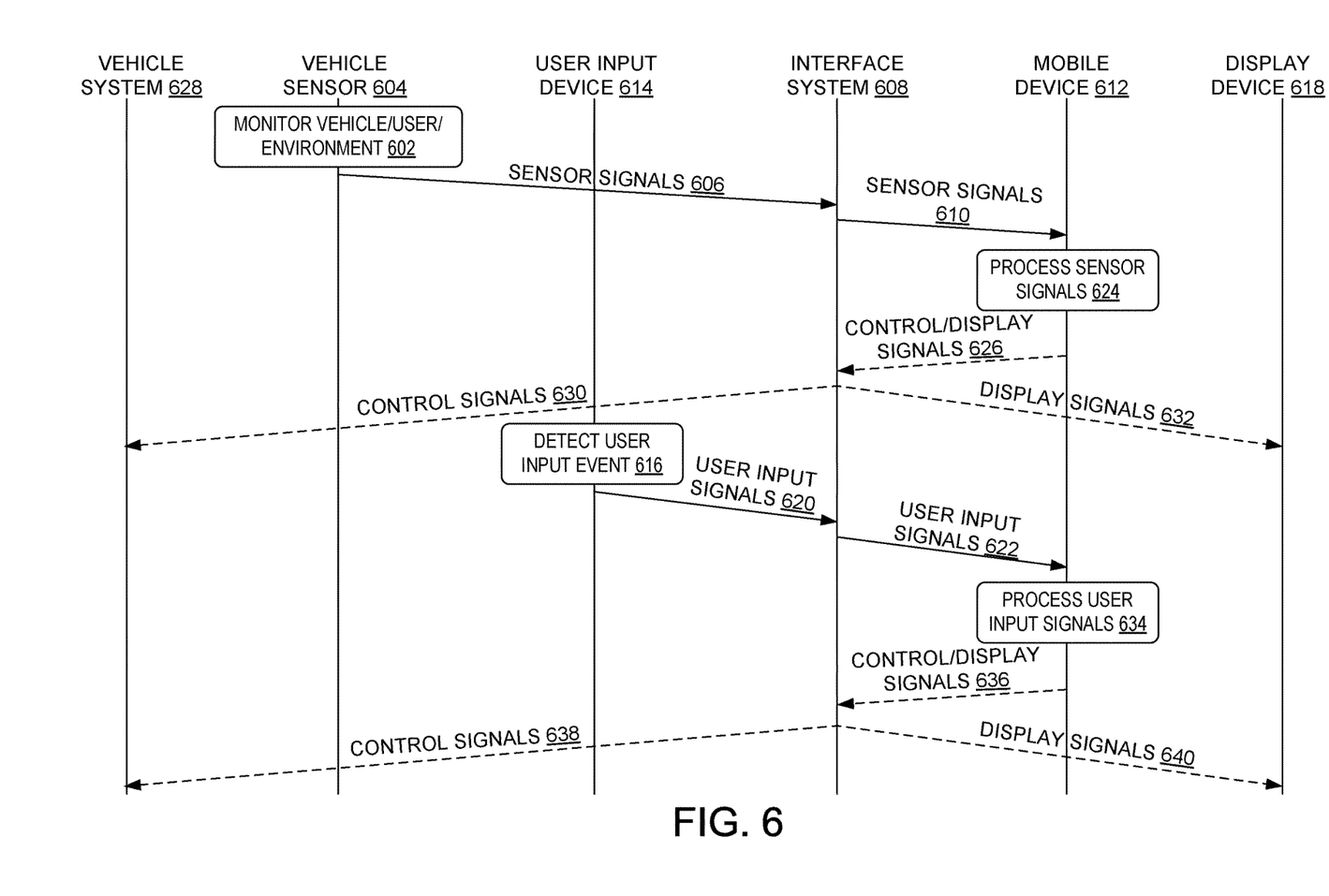
FIG. 6 is a communication diagram of information transmitted between vehicle elements and a mobile device in accordance with one or more embodiments of the present disclosure.

Turning briefly to FIG. 6, a communication diagram illustrating exemplary messages sent between vehicle components and a mobile device is shown. At 602, a vehicle sensor 604 monitors the vehicle, a user, and/or an environment of the vehicle/user to generate sensed data. Sensor signals 606, the content of which includes the sensed data from the monitoring operation of the vehicle sensor 604, are sent from the vehicle sensor to an interface system 608. The interface system 608 may not interpret or otherwise process the sensor signals 606, and instead forward the signals as sensor signals 610 to mobile device 612. The sensor signals 610 may be identical to the sensor signals 606 in some embodiments, while in other embodiments, the sensor signals 610 may only differ structurally from the sensor signals 606 such that the underlying sensed data is unchanged and/or not processed while being transmitted between the sensor and the mobile device.

Returning to FIG. 5, the method 500 may include receiving user input, as indicated at 510. The user input may be directed to a touch screen of a display device, as indicated at 512, and/or to a control element of the vehicle and received via a CAN bus, as indicated at 514. Responsive to receiving the user input, the interface system may transmit the user input to the mobile device, as indicated at 516. As indicated at 518, the transmitted user input may not be processed by the interface system. For example, while the signal transmitting the user input may be adjusted by the interface system to permit efficient and/or compatible transmission, the interface system may not interpret or otherwise alter the user request represented by the user input. In some embodiments, transmitting the received user input from the interface system to the mobile device may include bypassing any and/or all processors in the vehicle.

Turning back to FIG. 6, a user input device 614 may detect a user input event at 616. For example, the user input device 614 may include a touch screen of a display device 618 integrated into the vehicle and the user input event may be a touch input directed to a virtual button displayed on the display device 618. User input signals 620 representing the user input that triggered the user input event detection at 616 may be sent to the interface system 608. The interface system 608 may not interpret or otherwise process the user input signals 620, instead forwarding the signals as user input signals 622 to mobile device 612. The user input signals 622 may be identical to the user input signals 620 in some embodiments, while in other embodiments, the user input signals 622 may only differ structurally from the user input signals 620 such that the underlying user input instructions are unchanged and/or not processed while being transmitted between the user input controls and the mobile device.

As shown in FIG. 5, the method 500 may include receiving control signals from the mobile device at 520. The control signals may be generated at the mobile device based on the received sensed data from the in-vehicle interface system, as indicated at 522. The control signals may additionally or alternatively be generated at the mobile device based on the received user input from the in-vehicle interface system, as indicated at 524. The method 500 may include receiving display instructions from the mobile device at 526. Similarly to the control signals, the display instructions may be generated at the mobile device based on the received sensed data from the in-vehicle interface system, as indicated at 528 and/or based on the received user input from the in-vehicle interface system, as indicated at 530.

As shown in FIG. 6, the mobile device 612 may process received sensor signals at 624 and transmit control and/or display signals 626 to the interface system 608 in accordance with the processed sensor signals. For example, processing the sensor signals at 624 may include analyzing and/or interpreting the sensor signals 610 and generating instructions for a vehicle system 628 and/or the display device 618 based on the sensed data represented by the sensor signals. Upon receiving the control and/or display signals 626, the interface system 608 may transmit any control signals 630 to the vehicle system 628 and any display signals 632 to the display device 618. As described above, the interface system 608 may not process the received control and/or display signals 626 to provide additional or different instructions to the vehicle system 628 and/or the display device 618, respectively.

The mobile device 612 may process user input signals 622 at 634 to determine and generate control and/or display signals 636. As described above, the interface system 608 may receive the control and/or display signals 636, passing control signals 638 to the vehicle system 628 and display signals 640 to the display device 618 without processing the control and/or display signals 636 to provide additional or different instructions. Transmitting the display and/or control signals from the mobile device to the vehicle systems and/or display device may include bypassing any and/or all processors in the vehicle. In embodiments where the display device is communicatively connected directly to the mobile device, the display device may receive display signals directly from the mobile device without a processor processing the received display signals. In this way, the received display signals may provide instructions for the display device to alter and/or present a displayable image while the display device does not include an operating system. In embodiments where the display device is communicatively connected to the mobile device via the interface system, the display signals received at both the interface system and the display device may not be processed by a processor integrated in the vehicle (e.g., the display signals may only be processed by a mobile device or other external computing device).

The display signals received at the display device and/or the control signals received at the target vehicle systems may be responsive to, via the mobile device, the sensed data and/or the user input received at the control element(s). The received display and/or control signals may not be generated by any processor integrated in the vehicle with an operating system. For example, the control signals of the control and/or display signals 636 may be identical to the control signals 638 and the display signals of the control and/or display signals 636 may be identical to the display signals 640 in some embodiments. In other embodiments, the control signals of the control and/or display signals 636 may only be different from the control signals 638 structurally, without the underlying control information being changed and the display signals of the control and/or display signals 636 may be different from the display signals 640 structurally, without the underlying display instructions being changed.

While a single vehicle system 628 is illustrated as receiving both control signals 630 and 638 in FIG. 6, it is to be understood that control signals may target different vehicle systems based on the sensed data and/or the user input utilized in determining the control signals. For example, a portion of the control signals of the control and/or display signals 636 may be sent to a first vehicle system while a portion of the control signals of the control and/or display signals 636 may be sent to a second vehicle system. The mobile device 612 may also store received sensor signals and/or user input signals and provide control and/or display signals based upon the stored data.

By utilizing the computing resources of the mobile device to provide a user interface for controlling vehicle systems, the cost and complexity of an in-vehicle computing system may be reduced. As users often travel in a vehicle with a mobile device having spare computing resources, the redundancy of such resources in environments including a full in-vehicle computing device may be reduced by replacing the advanced processing capabilities of the full device with an in-vehicle interface system and integrated display having little or no processing power.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the in-vehicle interface system and/or mobile device described with reference to FIGS. 1 and 2. The described methods and associated actions may also be performed in various orders in addition to the order described in this application, in parallel, and/or simultaneously. The methods may be performed by executing stored instructions with one or more logic devices (e.g., processors) in combination with one or more additional hardware elements, such as storage devices, memory, hardware network interfaces/antennas, switches, actuators, clock circuits, etc. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. The following claims particularly point out subject matter from the above disclosure that is regarded as novel and non-obvious.

The invention claimed is:

1. An in-vehicle computing system comprising:
  a display device integrated into a vehicle; and
  a vehicle interface system communicatively connected to one or more vehicle sensors, one or more in-vehicle control elements, and a mobile device, the vehicle interface system configured to:
    receive, at the vehicle interface system, user input data from one or more of the in-vehicle control elements;
    transmit the received user input data from the vehicle interface system to the mobile device, bypassing any processor in the vehicle;
    receive, at the vehicle interface system, display instructions from the mobile device, the display instructions including adjustments to an image displayed on the display device based on the received user input data;
    transmit the display instructions to the display device while bypassing any processor in the vehicle;
    adjust the image displayed on the display device using the display instructions that are transmitted to the display device;
    receive, at the vehicle interface system, control instructions from the mobile device; receive sensed data via an interconnect of the vehicle; transmit the control instructions to a target vehicle system of the vehicle; and
    adjust operation of the target vehicle system of the vehicle using the control instructions that are received from the mobile device and transmitted to the target vehicle system, wherein the control instructions include adjustments to operation of the target vehicle system based on the received sensed data.

2. The in-vehicle computing system of claim 1, wherein the control instructions are generated based on the received sensed data.

3. The in-vehicle computing system of claim 1, wherein the display device is configured to display a static image when the vehicle interface system is not connected to the mobile device.

4. The in-vehicle computing system of claim 3, wherein the static image is an image saved in a storage device, the storage device being communicatively connected to the display device.

5. The in-vehicle computing system of claim 1, wherein the display device and the vehicle interface system do not include an operating system.

6. The in-vehicle computing system of claim 1, wherein the vehicle includes a storage structure for receiving the mobile device, the storage structure having an integrated connector providing a communication link to the vehicle interface system.

7. The in-vehicle computing system of claim 1, wherein the one or more in-vehicle control elements are physically and permanently positioned on the vehicle.

8. The in-vehicle computing system of claim 7, wherein the one or more in-vehicle control elements include at least one of a steering wheel control, a control element integrated in an instrument panel of the vehicle, and a microphone.

9. The in-vehicle computing system of claim 7, wherein the display device includes a touch screen and the one or more in-vehicle control elements include the touch screen.

10. A method of controlling vehicle systems of a vehicle, the method comprising:
  receiving, at a vehicle interface system communicatively connected to one or more vehicle sensors, one or more in-vehicle control elements, and a mobile device, user input data from one or more of the in-vehicle control elements;
  transmitting the received user input data from the vehicle interface system to the mobile device, bypassing each processor in the vehicle;
  receiving, at the vehicle interface system, display instructions from the mobile device, the vehicle display instructions including adjustments to an image displayed on a display device based on the received user input data;

transmitting the vehicle display instructions to the display device while bypassing each processor in the vehicle;

adjusting the image displayed on the vehicle display device using the display instructions that are transmitted to the display device;

receiving, at the vehicle interface system, control instructions from the mobile device; receiving sensed data via an interconnect of the vehicle; transmitting the control instructions to a target vehicle system of the vehicle; and adjusting operation of the target vehicle system based on the control instructions that are received from the mobile device and transmitted to the target vehicle system, wherein the control instructions include adjustments to operation of the target vehicle system based on the received sensed data.

11. The method of claim 10, wherein transmitting the control instructions to the target vehicle system of the vehicle includes transmitting the control instructions to the target vehicle system via a Controller-Area Network (CAN) bus of the vehicle.

12. The method of claim 10, wherein receiving the user input data from the one or more of the in-vehicle control elements includes receiving the user input data from a touch screen of the vehicle display, wherein the vehicle display is integrated in the vehicle.

13. The method of claim 10, wherein receiving the user input data from the one or more of the in-vehicle control elements includes receiving the user input data from a control element of the vehicle via a Controller-Area Network (CAN) bus.

14. The method of claim 10, wherein the control instructions are generated based on the received sensed data.

15. The method of claim 10, wherein the method further comprises displaying a static image on the vehicle display when the interface system is not connected to the mobile device.

16. The method of claim 15, wherein the static image is an image saved in a storage device, the storage device being communicatively connected to the vehicle display.

17. The method of claim 10, wherein the one or more of the in-vehicle control elements are physically and permanently positioned on the vehicle.

18. The method of claim 17, wherein the one or more of the in-vehicle control elements include at least one of a steering wheel control, a control element integrated in an instrument panel of the vehicle, and a microphone.

* * * * *